United States Patent
Sosa et al.

(12) 
(10) Patent No.: US 6,982,309 B2
(45) Date of Patent: Jan. 3, 2006

(54) SYNTHESIS OF BRANCHED STYRENIC COPOLYMERS WITH P-T-BUTYLSTYRENE

(75) Inventors: Jose M. Sosa, Deer Park, TX (US); Kenneth P. Blackmon, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 60 days.

(21) Appl. No.: 10/742,163

(22) Filed: Dec. 19, 2003

(65) Prior Publication Data

US 2005/0137373 A1 Jun. 23, 2005

(51) Int. Cl.
*C08F 212/12* (2006.01)

(52) U.S. Cl. .................. 526/347; 526/227; 526/322; 526/336; 521/146; 521/147

(58) Field of Classification Search ............... 526/227, 526/322, 336, 347; 521/146, 147
See application file for complete search history.

(56) References Cited

U.S. PATENT DOCUMENTS

| | | | | |
|---|---|---|---|---|
| 3,137,682 A | * | 6/1964 | Corson et al. | 526/346 |
| 3,654,250 A | * | 4/1972 | Davis | 526/237 |
| RE29,654 E | * | 5/1978 | Petersen et al. | 526/90 |
| 5,502,133 A | * | 3/1996 | Ishihara et al. | 526/347 |
| 6,353,066 B1 | | 3/2002 | Sosa | |
| 6,627,720 B2 | * | 9/2003 | Campbell et al. | 526/336 |

OTHER PUBLICATIONS

Polymer Processes, C.E. Schildknecht (ed.), Interscience, N.Y., pp. 199–201 (1956).*

* cited by examiner

*Primary Examiner*—Fred Teskin
(74) *Attorney, Agent, or Firm*—Madan, Mossman & Sriram, P.C.

(57) ABSTRACT

It has been discovered that improved polystyrene products may be obtained by polymerizing styrene in the presence of p-t-butyl styrene (TBS) and optionally at least one di-olefinic substituted aromatic compound, such as isopropenyl styrene, sec-butenyl styrene, m-isobutenyl styrene, p-diisopropenyl benzene, diallyl benzene, and/or diallyl phthalate. The resulting copolymers have a higher glass transition temperature ($T_g$), a higher molecular weight distribution (MWD), a higher Mz, and a lower melt flow index (MFI) as compared with a polymerized product made by an otherwise identical method except that TBS and/or the di-olefinic substituted aromatic compound are not used. These copoly-mers are also more highly branched as compared with a polymerized product made by an otherwise identical method in the absence of TBS and/or a di-olefinic substituted aromatic compound.

19 Claims, 3 Drawing Sheets

Effect of TBS on MFI

Effect of TBS on Molecular Weight Distribution

Relation of Mw and Mz

SYNTHESIS OF BRANCHED STYRENIC COPOLYMERS WITH P-T-BUTYLSTYRENE

FIELD OF THE INVENTION

The present invention is related to methods and compositions useful to improve the manufacture of copolymers of styrene. It relates more particularly to methods of polymerizing and copolymerizing styrene with p-t-butyl styrene (TBS) that yield copolymers with improved properties over polymers that do not incorporate TBS.

BACKGROUND OF THE INVENTION

The polymerization of styrene is a very important industrial process that supplies materials used to create a wide variety of polystyrene-containing articles. This expansive use of polystyrene results from the ability to control the polymerization process. Thus, variations in the polymerization process conditions are of utmost importance since they in turn allow control over the physical properties of the resulting polymer. The resulting physical properties determine the suitability of polystyrene for a particular use. For a given product, several physical characteristics must be balanced to achieve a suitable polystyrene material. Among the properties that must be controlled and balanced are average molecular weights (Mn, Mw and Mz) of the polymer, molecular weight distribution (MWD), melt flow index (MFI), and the glass transition temperature ($T_g$).

U.S. Pat No. 5,540,813 by Sosa, et. al., which is incorporated herein by reference, discloses a process for preparing monovinyl aromatic polymers, such as polystyrene, which utilizes a combination of sequentially ordered multiple reactors, heat exchangers and devolatilizers to strictly control polymer properties such as the molecular weight distribution and melt flow index.

The relationship between the molecular weight and the storage modulus is of importance in polymer foam applications. Such foam applications require high molecular weight polymers having a high storage modulus. It is thought that the storage modulus is related to the degree of branching along the polymer chain. As the degree of branching increases, the likelihood that a branch entangles with other polymer chains increases. A polymer product having a higher degree of branching or cross-linking tends to have a higher storage modulus and, therefore, better foam stability characteristics.

Methods for preparing branched polymers are well-known in the art. For example, the preparation of branched polystyrene by free radical polymerization has been reported. However, this method increases the branching in the devolatilization step and produces a polymer with an undesirably low molecular weight.

Rather than employing free radical polymerization, some have used multi-functional mercaptans to form branched polymers. While materials having an acceptable molecular weight can be prepared by this method, these products are unacceptable for foam applications due to their undesirable flow properties.

The properties of randomly branched polystyrene prepared in the presence of divinylbenzene have been reported by Rubens (L. C. Rubens, *Journal of Cellular Physics*, pp 311–320, 1965). However, polymers having a useful combination of molecular weight and cross-linking are not attainable. At low concentrations of divinylbenzene, low molecular weight polymers having little branching result. However, higher concentrations of the cross-linking agent result in excessive cross-linking and concomitant gel formation that is highly undesirable in industrial polystyrene processes. Similar results and problems were reported by Ferri and Lomellini (*J. Rheol.* 43(6), 1999).

Commercial polystyrene made by the conventional free-radical process yields linear structures. As noted, methods to prepare branched polystyrenes, however, are not easily optimized and few commercial non-linear polystyrenes are known. Studies of branched polymers show that these polymers possess unique molecular weight-viscosity relationships due to the potential for increased molecular entanglements. Depending upon the number and length of the branches, non-linear structures can give melt strengths equivalent to that of linear polymers at slightly higher melt flows.

U.S. Pat. No. 6,353,066 to Sosa describes a method of producing a copolymer by placing a vinylbenzene (e.g. styrene) in a reactor, placing a cross-linking agent (e.g. divinylbenzene) in the reactor, and placing a chain transfer agent (e.g. mercaptan) in the reactor and forming a polyvinylbenzene in the presence of the cross-linking agent and chain transfer agent.

It would be desirable if methods could be devised or discovered to provide vinylaromatic polymers with increased branching, such as branched polystyrene with improved properties. It would also be helpful if a method could be devised that would help optimize the physical properties of vinylaromatic polymers having increased branching. Such polymers may have a higher melt strength than polymers with linear chains, and may improve processability and mechanical properties of the final product (e.g. increase density in foam application).

SUMMARY OF THE INVENTION

There is provided, in one form, a method for producing an improved copolymerized product that involves polymerizing at least one vinylaromatic monomer in the presence of at least one initiator and p-t-butyl styrene (TBS) and optionally at least one di-olefinic substituted aromatic compound to give a copolymerized product.

In another embodiment of the invention, there is provided a vinylaromatic monomer resin that includes at least one vinylaromatic monomer, at least one initiator, p-t-butyl styrene (TBS) and optionally at least one di-olefinic substituted aromatic compound. The invention also includes foamed articles made with these vinylaromatic monomer resins.

In another embodiment of the invention, there is provided an improved copolymerized product made by the process involving polymerizing at least one vinylaromatic monomer in the presence of at least one initiator, p-t-butyl styrene (TBS), and optionally at least one di-olefinic substituted aromatic compound, and then recovering the copolymerized product.

DETAILED DESCRIPTION OF THE INVENTION

Figure 1:
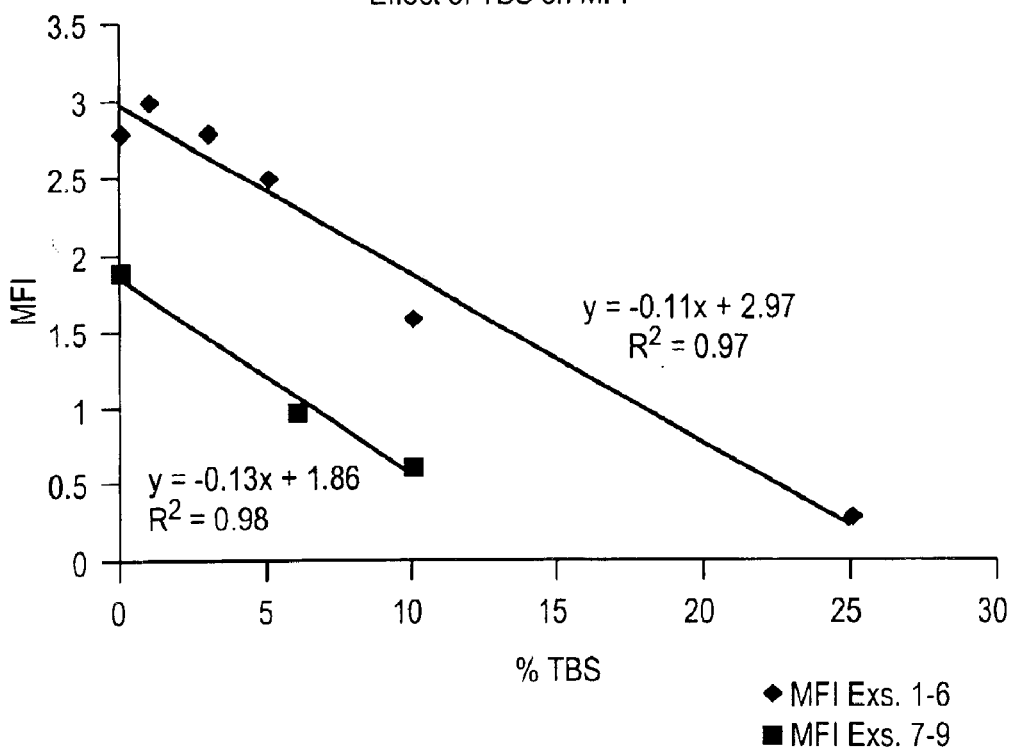
FIG. 1 is a graph showing a plot of melt flow index (MFI) as a function of TBS for Examples 1–6 and a plot of MFI as a function of TBS for Examples 7–9.

In the present invention, polymerization processes for the preparation of copolymers, such as p-t-butyl styrene (TBS) copolymers, are discussed. The present invention is particularly useful with polymerization systems such as those disclosed in the aforementioned Sosa '813 patent. Polymerizations of styrene with TBS have been carried out, and it was surprisingly discovered that branched polymers may be formed due to the optional presence of di-olefinic substituted aromatic compound in TBS. Improvements in the storage modulus can also be obtained by stiffening the polymer chain in the case of adding the t-butyl group to the aromatic ring. An increase in Tg is also possible with the methods and compositions of this invention.

The copolymers provide important characteristics that could make them useful as materials for foam grades. The copolymers have higher glass transition temperatures and higher Mz values, as contrasted with polystyrene made without TBS or the di-olefinic substituted aromatic compounds. In addition, the t-butyl group offers a bulky non-polar group which will improve the solubility of non-polar blowing agents such as carbon dioxide and HFCs. The t-butyl group from TBS also stiffens the polymer chain, and because of its bulkiness keeps the chains apart, both properties which create more space for the blowing agents in foamed products.

The inventors have explored the potential for providing branched polystyrene having at least some increased branching by using TBS in conjunction with relatively much smaller amounts of di-olefinic substituted aromatic compounds. The invention concerns initiating polymerization of a vinyl aromatic monomer such as styrene in various solvents and in the presence of an initiator and in the additional presence of TBS and optionally a relatively smaller amount of at least one di-olefinic substituted aromatic compound to obtain branched structures.

Vinylaromatic polymerization processes are well known. In one embodiment the vinylaromatic compound may be styrene. The compositions of the invention are preferably made by batch polymerization in the presence of initiators at concentrations of from about 100 to about 800 ppm and using a solvent. In another non-limiting embodiment of the invention, the initiators are used at concentrations from about 100 to about 600. In one non-limiting embodiment of the invention, hydroperoxide and peroxycarboxylate initiators useful in making the invention include peroxide initiators having a half-life of one-half to one hour at 110–130° C., and include but are not necessarily limited to, 1,1-di-(t-butylperoxy)cyclohexane (LUPERSOL® 331 or L-331 available from ATOFINA Chemicals, Inc.); 1,1-di-(t-amylperoxy)cydohexane (LUPERSOL® 531 or L-531 available from ATOFINA Chemicals, Inc.); ethyl-3,3-di (t-butylperoxy) butyrate (LUPERSOL® 233 or L-233 available from ATOFINA Chemicals, Inc.); t-amyl peroxy -2-ethyl-hexyl carbonate (TAEC), t-butylperoxy isopropyl carbonate (TBIC), ethyl-3,3-di(t-butylperoxy) butyrate; t-butyl perbenzoate; 1,1-di-(t-butylperoxy)-3,3,5-trimethyl-cyclohexane (LUPERSOL® 231 or L-231 available from ATOFINA Chemicals, Inc.); ethyl-3,3-di(t-amylperoxy) butyrate (LUPERSOL® 533); and di-isopropyl benzene monohydroperoxide (DIBMH). Tri- and tetrafunctional initiators, such as, Atofina's JWEB-50, can also be used.

A possible temperature profile to be followed in producing the subject compositions is about 110° C. for about 120 minutes, about 130° C. for about 60 minutes, and about 150° C. for about 60 minutes, in one non-limiting embodiment. In general, within the context of this invention, the polymerization is conducted at a temperature in the range from about 110° C. to about 170° C., alternatively up to about 210° C., in another non-limiting embodiment. The polymer is then dried and devolatilized by conventional means. Although batch polymerizations are used to describe the invention, the reactions described can be carried out in continuous units, as the one described by Sosa and Nichols in U.S. Pat. No. 4,777,210, incorporated by reference herein. Suitable optional solvents for the polymerization include, but are not necessarily limited to ethylbenzene, xylenes, toluene, hexane and cyclohexane.

In one non-limiting embodiment of the invention, the amount of TBS ranges from 1 to about 25 wt %. In an alternate non-limiting embodiment of the invention, the amount of TBS may range from 1 to about 10 wt %. The amount of TBS used is appreciably greater than the amount of di-olefinic substituted aromatic compound employed. In one non-limiting embodiment, the amount of di-olefinic substituted aromatic compound ranges from 25 to about 400 ppm, based on the total amount of vinyl aromatic monomer and TBS. In an alternate non-limiting embodiment of the invention, the amount of di-olefinic substituted aromatic compound may range from 25 to about 200 ppm. Stated another way, the amount of TBS is at least 100 times that of the di-olefinic substituted aromatic compound in one non-limiting embodiment of the invention, and in an alternate non-binding embodiment of the invention, the amount of TBS is at least 20 times that of the di-olefinic substituted aromatic compound. It should also be understood that the term "t-butyl styrene" as used herein includes all possible isomers: para-, meta- and ortho-. The most likely commercially available isomer is para-TBS.

The term "di-olefinic substituted aromatic compounds" in the context of this invention includes aromatic compounds having at least two substituents, each of which in turn has at least one olefinic functionality, although they may have more than one unsaturated group. Suitable examples of di-olefinic substituted aromatic compounds to be used with TBS in this invention include, but are not necessarily limited to, isopropenyl styrene, sec-butenyl styrene, m-isobutenyl styrene, p-diisopropenyl benzene, diallyl benzene, diallyl phthalate, and mixtures thereof. In one non-binding embodiment of the invention, the definition of suitable di-olefinic substituted aromatic compounds does not include divinyl benzene (DVB). DVB has been identified as a crosslinker in other work. Those knowledgeable in the art will recognized that most vinyl monomers are readily polymerizable by peroxy radicals, while allyl, isoprenyl, isobutenyl and other olefinic monomers are not as reactive due to the stability of the radicals formed after addition of the peroxy group. These substituents, however, can react at higher temperatures and could be involved in chain transfer and crosslinking reactions. It may be understood in one non-limiting view of the invention that the di-olefinic substituted aromatic compounds are acting like crosslinkers and/or chain transfer agents in the copolymerizations of this invention.

As will be demonstrated, the copolymerized vinylaromatic/TBS product is expected to be more highly branched as compared with a polymerized product made by an otherwise identical method except that TBS and the di-olefinic substituted aromatic compounds are not used. Furthermore, the copolymerized products of this invention have a higher glass transition temperature ($T_g$), a higher molecular weight distribution (MWD) and a higher average molecular weight (Mz) as compared with a polymerized product made by an otherwise identical method except that TBS and the divinyl compound and/or other di-olefinic substituted aromatic compounds are not used. Additionally, the copolymerized products herein have a lower melt flow index (MFI) as compared with a polymerized product made by an otherwise identical method except that TBS and the di-olefinic substituted aromatic compounds and/or DVB are not used. In some cases, the copolymers of this invention will have improved melt strength thereby permitting better foam formation for extrusion foam blown with conventional blowing agents and inert gases such as carbon dioxide.

Optional stabilizers or nucleating agents are well known to those skilled in the art of extrusion foams. Useful stabilizers or nucleating agents include, but are not necessarily limited to, talc, waxes, lubricants such as mineral oil and the like.

The invention will now be described further with respect to, actual Examples that are intended simply to further illustrate the invention and not limit it in any way.

EXAMPLES 1–6

The following examples demonstrate how the use of TBS and components present in TBS influence the rate, molecular weights, and/or MFI. The desired outcomes were to produce new crystal foam grades at higher production rates or to produce materials that would enhance the solubility of HFCs in PS.

Table 1 shows the results of the work where the objective was to evaluate the effects of TBS incorporation on polymer molecular weight and glass transition temperature, Tg. The results showed that copolymers of styrene with TBS can be produced under normal polymerization conditions, with the reactivity of TBS being somewhat lower than that of styrene. The molecular weights (particularly Mw and Mz) of the polymers increased and melt flows decreased with increasing TBS concentration, perhaps due to some intermolecular crosslinking.

Polydispersity thus also increased with increasing TBS proportion. The glass transition temperatures of the polymers increased with increasing TBS content.

The polymerization reactions were conducted in a 500 ml resin kettle equipped with a mechanical stirrer and nitrogen inlet. The monomer feeds consisted of the indicated mixtures of styrene and TBS (available from Deltech, purity >98.5%) with 170 PPM L-233 as the initiator. The reaction temperature profile was as follows: 2 hrs/110° C., 1 hr/130° C., 1 hr/150° C. The resulting polymer solutions (75–80% conversion) were subsequently devolatilized in a vacuum oven for 0.5 hr at 240° C. and <3 mm Hg.

TABLE I

Characteristics of Styrene/p-t-Butylstyrene (TBS) Copolymers

| Ex. | % TBS in Feed | % TBS in Copolymer | Mn/1000 | Mw/1000 | Mz/1000 | Poly Disp. | MFI | Tg, ° C. |
|---|---|---|---|---|---|---|---|---|
| 1 | 0 | 0 | 114.3 | 272.3 | 462.1 | 2.38 | 2.8 | 103.8 |
| 2 | 1 | — | 109.7 | 274.7 | 485.7 | 2.50 | 3.0 | 103.4 |
| 3 | 3 | — | 116.5 | 299.5 | 554.0 | 2.57 | 2.8 | 106.4 |

TABLE I-continued

Characteristics of Styrene/p-t-Butylstyrene (TBS) Copolymers

| Ex. | % TBS in Feed | % TBS in Copolymer | Mn/1000 | Mw/1000 | Mz/1000 | Poly Disp. | MFI | Tg, ° C. |
|---|---|---|---|---|---|---|---|---|
| 4 | 5 | 3.7 | 118.5 | 328.4 | 646.3 | 2.77 | 2.5 | 105.4 |
| 5 | 10 | 7.7 | 116.0 | 390.0 | 891.8 | 3.36 | 1.6 | 106.5 |
| 6 | 25 | 18.4 | 136.3 | 834.3 | 2954.3 | 6.12 | 0.3 | 111.9 |

Analysis of the composition of TBS from Deltech Corporation gave the composition shown in Table II. The compounds sec-butenyl styrene and m-isobutenyl styrene were inferred from mass spectroscopy data.

TABLE II

Deltech TBS Analysis

| Component | Wt % Range |
|---|---|
| p-tert-butylstyrene (TBS) | 95.5–96.2 |
| m-tert-butylstyrene | 0.5–1.2 |
| isopropenyl styrene (IPS) | ~0.2 |
| sec-butenyl styrene | 0.4–0.6 |
| m-isobutenyl styrene | 0.4–0.6 |
| p-diisopropenyl benzene (p-DiPEB) | 0.2–0.4 |
| p-t-butyl ethyl benzene (p-TBEB) | 1.0–2.5 |

The compounds IPS, sec-butenyl styrene, m-isobutenyl styrene, and p-DiPEB are all understood to be difunctional, but in all cases the olefinic substituent on styrene does not appear to be nearly as reactive as the styrenic vinyl double bond. IPS was found to give molecular weight distribution effects upon increasing IPS concentration. P-TBEB is non-reactive and depending upon the system, may act as a plasticizer.

EXAMPLES 7–9

The polymerization reactions of Examples 7, 8 and 9 were conducted in a 500 ml resin kettle equipped with a mechanical stirrer and nitrogen inlet using Aldrich TBS (93% purity, 100 PPM TBC). The initiator formulation consisted of 300 PPM of L-331 and 75 PPM of L-233. The reaction temperature profile was as follows: 2 hrs/110° C., 1 hr/130° C., 1 hr/150° C.. The resulting polymer solutions (50% conversion) were subsequently devolatilized in a vacuum oven for 25 minutes at 225° C. and 0.5–0.8 mm Hg (67–107 Pa). Table III presents the molecular weight and the MFI obtained for three feed formulations.

TABLE III

Synthesis of Styrene/TBS Copolymers Using a L-331/L-233 Formulation

| Ex. | % TBS | Mn(000) | Mw(000) | Mz(000) | MWD | MFI | Ave. % PS/hr |
|---|---|---|---|---|---|---|---|
| 7 | 0 | 131 | 298 | 470 | 2.3 | 1.94 | 14.7 |
| 8 | 6 | 142 | 395 | 772 | 2.8 | 0.98 | 15.3 |
| 9 | 10 | 142 | 523 | 1399 | 3.7 | 0.62 | 17.5 |

The effect of TBS on rate and molecular weights are summarized as follows:

The use of 10% TBS gave very viscous solutions and the reaction was terminated after the second ramp or 180 minutes. The average rate increased by 20% in the batch reactor. The average rate is calculated by dividing the final conversion by run time in hours.

TBS has a significant influence on MFI. FIG. 1 compares the data obtained in from Examples 7–9 with data from Examples 1–6 using a different initiator formulation. The reason for the lower MFI obtained in Examples 7–9 is due to the fact that L-331, which has a one-hour half-life of 115° C., gives higher conversions at the lower temperature, thus, a lower MFI.

Figure 2:
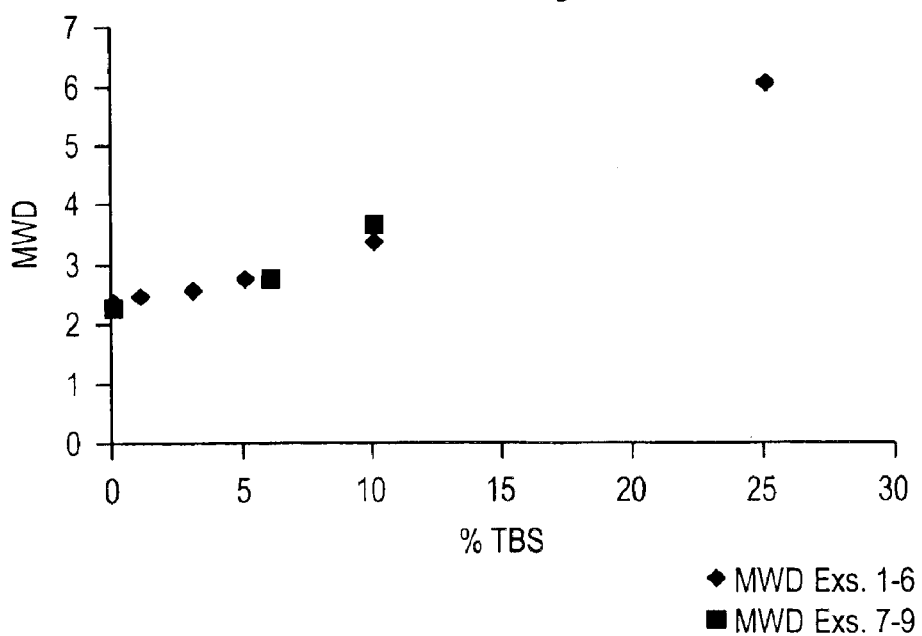
FIG. 2 is a graph showing a plot of molecular weight distribution (MWD) as a function of TBS for Examples 1–6 and a plot of MFI as a function of TBS for Examples 7–9.

The molecular weight distribution increases significantly as the level of TBS is increased as shown in the comparison of the results from Examples 1–6 with the results of Examples 7–9 of FIG. 2.

Figure 3:
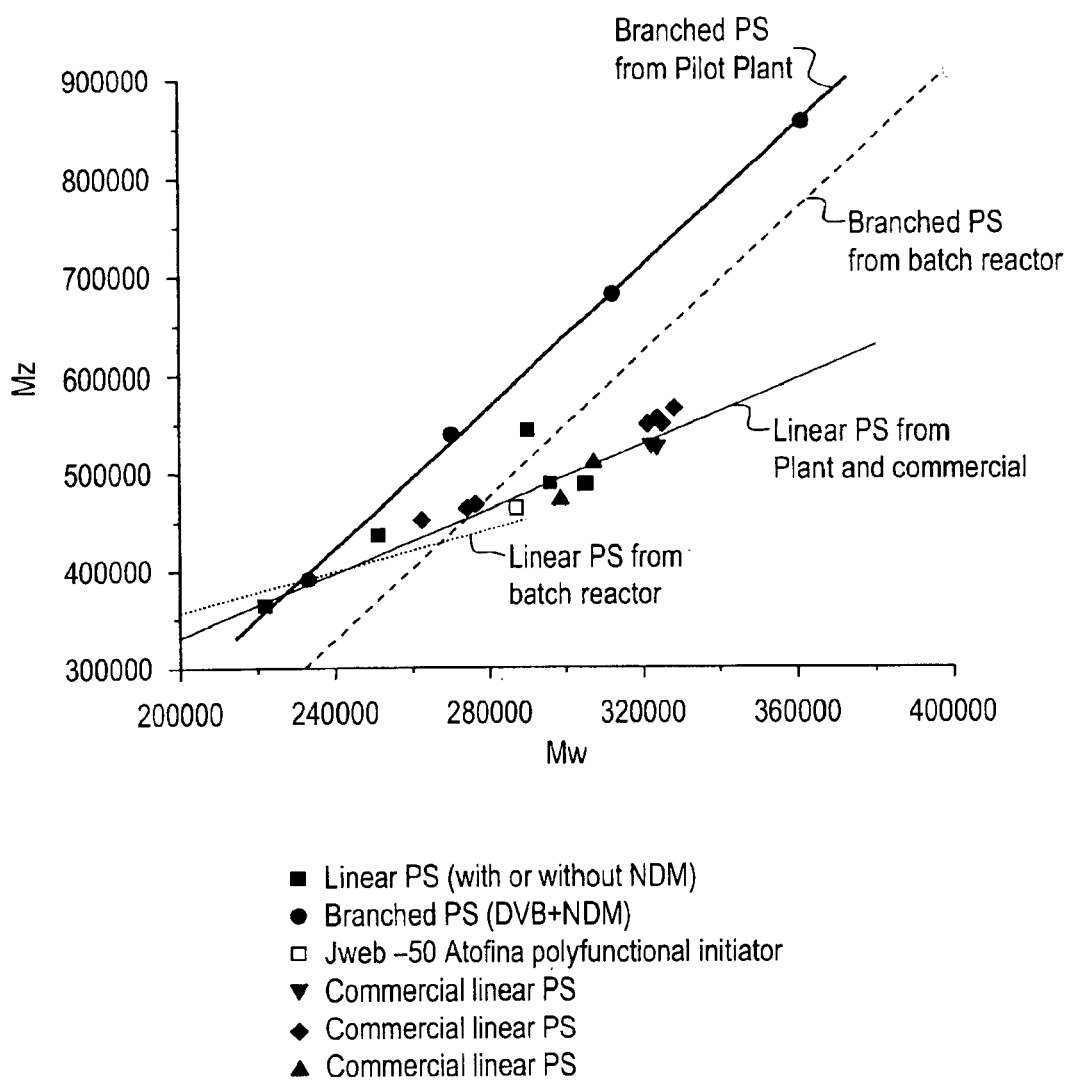
FIG. 3 is a graph comparing plots of Mw v. Mz for linear and branched polystyrene.

Mw vs. Mz plots for pilot plant products produced with divinylbenzene is presented in FIG. 3. This Figure shows that the relationship between Mw and Mz are different for linear and branched polymers, that plots for branched polystyrene has a characteristically steeper slope than the plots for linear polystyrene.

Figure 4:
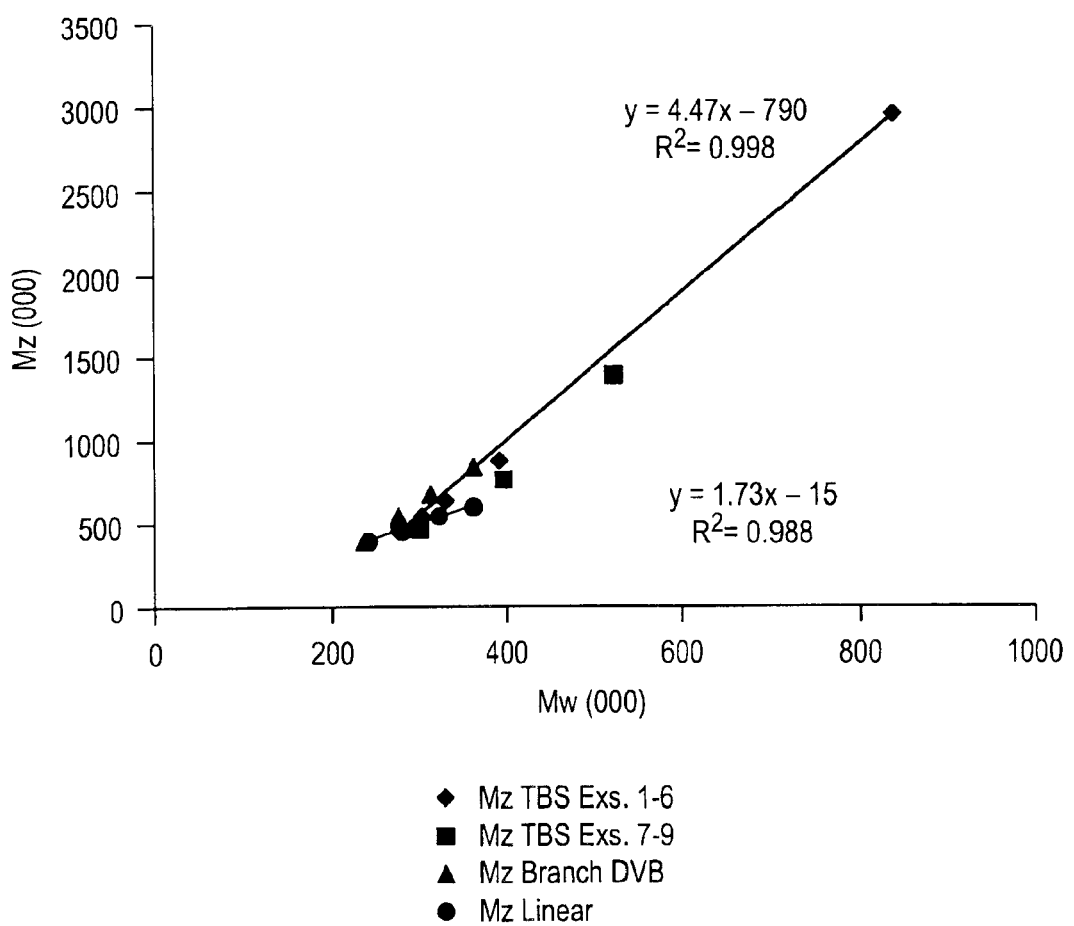
FIG. 4 is a graph comparing plots of Mw v. Mz for polystyrene prepared with TBS and with divinyl benzene (DVB) to demonstrate that polystyrene prepared with TBS gives a branched copolymer.

FIG. 4 shows a comparison of Mw vs. Mz plots obtained for Examples 1–6 and for Examples 7–9. Plots of Mw vs. Mz for materials prepared with TBS are practically identical with that obtained from materials made with DVB. This graph suggests that TBS is quite effective at producing non-linear (i.e. branched) structures.

Without wishing to be bound by any one theory, it is expected that crosslinking occurs due to the presence of one or more di-olefinic substituted aromatic compound. If this is the case, the use of TBS seems to lead to branched structures.

This study shows that TBS and/or one of its side-products increases polymerization rate at concentrations above 5 wt % and also increases polydispersity of the copolymer. The effect of TBS on MFI was tested with two different initiator formulations. In both cases, MFI dropped with TBS levels above 5 wt %. Plots of Mw vs. Mz indicate that TBS can be used to form non-linear structures.

The resins of this invention are expected to find use in foam applications where increased density and high storage moduli provide a more stable product. Specific foam applications include, but are not necessarily limited to, insulation foam boards, cups, plates, food packaging. The styrene-based polymers of the present invention are expected to find use in other injection molded or extrusion molded articles. Thus, the styrene-based polymers of the present invention may be widely and effectively used as materials for injection molding, extrusion molding or sheet molding. It is also expected that the polymer resins of this invention can be used as molding material in the fields of various different products, including, but not necessarily limited to, household goods, electrical appliances and the like.

In the foregoing specification, the invention has been described with reference to specific embodiments thereof, and has been demonstrated as effective in providing methods for preparing polymers using TBS together with optional di-olefinic substituted aromatic compounds. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinylaromatic monomers, TBS, di-olefinic substituted aromatic compounds and other components falling within the claimed parameters, but not specifically identified or tried in a particular polymer system, are anticipated and expected to be within the scope of this invention. Further, the methods of the invention are expected to work at other conditions, particularly temperature, pressure and proportion conditions, than those exemplified herein.

We claim:

1. A method for producing an improved copolymerized product comprising:
   polymerizing at least one vinylaromatic monomer in the presence of
   at least one peroxy initiator; and
   p-t-butyl styrene (TBS); and
   recovering a copolymerized product.

2. The method of claim 1 further comprising polymerizing the vinylaromatic monomer with TBS in the presence of at least one di-olefinic substituted aromatic compound.

3. The method of claim 2 where the di-olefinic substituted aromatic compounds is selected from the group consisting of isopropenyl styrene, sec-butenyl styrene, m-isobutenyl styrene p-diisopropenyl benzene, diallyl benzene, diallyl phthalate, and mixtures thereof.

4. The method of claim 2 where the amount of di-olefinic substituted aromatic compound ranges from 25 to about 400 ppm, based on the total amount of monomers.

5. The method of claim 1 where the amount of TBS ranges from 1 to about 25%, based on the total amount of monomers.

6. The method of claim 2 where the amount of TBS is at least 100 times that of the di-olefinic substituted aromatic compound.

7. The method of claim 1 where the vinylaromatic monomer is styrene.

8. The method of claim 1 where the polymerizing is conducted at a temperature between about 110° C. and about 210° C.

9. A method for producing an improved polymerized product comprising:
   polymerizing styrene in the presence of
   at least one initiator;
   from about 1 to about 25 wt % p-t-butyl styrene (TBS);
   from about 25 to about 400 ppm of at least one di-olefinic substituted aromatic compound selected from the group consisting of isopropenyl styrene, sec-butenyl styrene, m-isobutenyl styrene, p-diisopropenyl benzene, diallyl benzene, diallyl phthalate, and mixtures thereof;
   at a temperature between about 110° C. and about 210° C., where the proportions are based on the total amount of monomer; and
   recovering a copolymerized product.

10. A vinylaromatic monomer resin comprising at least one vinylaromatic monomer, at least one peroxy initiator, and an amount of p-t-butyl styrene (TBS).

11. The vinylaromatic monomer resin of claim 10 where the amount of TBS ranges from 1 to about 25 wt %, based on the total amount of monomers.

12. The vinylaromatic monomer resin of claim 10 further comprising at least one di-olefinic substituted aromatic compound.

13. The vinylaromatic monomer resin of claim 12 wherein the amount of TBS is at least 100 times that of the di-olefinic substituted aromatic compound.

14. The vinylaromatic monomer resin of claim 12 where the di-olefinic substituted aromatic compound is selected from the group consisting of isopropenyl styrene, sec-butenyl styrene, m-isobutenyl styrene, p-diisopropenyl benzene, diallyl benzene, diallyl phthalate, and mixtures thereof.

15. The vinylaromatic monomer resin of claim 12 where the amount of di-olefinic substituted aromatic compound ranges from 25 to about 400 ppm, based on the total amount of monomers.

16. The vinylaromatic resin of claim 10 where the vinylaromatic monomer is styrene.

17. A foamed article made with the vinylaromatic monomer resin of claim 10.

18. A vinylaromatic monomer resin comprising styrene, at least one initiator, from 1 to about 25 wt % of p-t-butyl styrene (TBS) and from 25 to about 400 ppm of at least one di-olefinic substituted aromatic compound selected from the group consisting of isopropenyl styrene, sec-butenyl styrene, m-isobutenyl styrene, p-diisopropenyl benzene, diallyl benzene, diallyl phthalate, and mixtures thereof, where the proportions are based on the total amount of monomer.

19. An improved copolymerized product made by the process comprising:

polymerizing styrene in the presence of at least one initiator;

p-t-butyl styrene (TBS); and at least one di-olefinic substituted aromatic compound selected from the group consisting of improperly styrene, sec-butane styrene, am-isobutenyl styrene, p-diisopropenyl benzene, diallyl benzene, diallyl phthalate, and mixtures thereof; and at a temperature between about 110° C. and about 210° C. recovering a copolymerized product.

\* \* \* \* \*